US012330737B2

(12) United States Patent
Morotomi et al.

(10) Patent No.: US 12,330,737 B2
(45) Date of Patent: Jun. 17, 2025

(54) SADDLE-RIDING VEHICLE

(71) Applicant: KAWASAKI MOTORS, LTD., Hyogo (JP)

(72) Inventors: Satoshi Morotomi, Kobe (JP); Keisuke Ishiyama, Kobe (JP)

(73) Assignee: KAWASAKI MOTORS, LTD. (JP)

( * ) Notice: Subject to any disclaimer, the term of this patent is extended or adjusted under 35 U.S.C. 154(b) by 914 days.

(21) Appl. No.: 17/489,039

(22) Filed: Sep. 29, 2021

(65) Prior Publication Data

US 2022/0144374 A1 May 12, 2022

(30) Foreign Application Priority Data

Nov. 12, 2020 (JP) .................... 2020-188445

(51) Int. Cl.
*B62J 37/00* (2006.01)
*B60K 15/035* (2006.01)
*B62J 41/00* (2020.01)
*B62K 11/04* (2006.01)
*B62K 19/30* (2006.01)
*B62K 19/38* (2006.01)
*F02M 25/08* (2006.01)

(52) U.S. Cl.
CPC ............ *B62K 19/30* (2013.01); *B62J 37/00* (2013.01); *B62J 41/00* (2020.02); *B62K 11/04* (2013.01); *B62K 19/38* (2013.01); *F02M 25/0872* (2013.01); *B60K 2015/03514* (2013.01)

(58) Field of Classification Search
CPC ...................................... B62J 37/00
See application file for complete search history.

(56) References Cited

U.S. PATENT DOCUMENTS

| 9,932,085 | B2 | 4/2018 | Nishida | |
| 10,131,396 | B2 * | 11/2018 | Yasuta | B62J 15/00 |
| 10,570,858 | B2 * | 2/2020 | Morita | B62J 37/00 |
| 10,988,201 | B2 * | 4/2021 | Sakaguchi | B62J 37/00 |
| 11,077,907 | B2 * | 8/2021 | Yamamoto | B60K 15/03504 |
| 11,590,837 | B2 * | 2/2023 | Hatanaka | F01P 3/18 |
| 2017/0267310 | A1 | 9/2017 | Nishida | |

FOREIGN PATENT DOCUMENTS

| JP | 01-175586 A | | 7/1989 |
| JP | H01175586 A | * | 7/1989 |
| JP | 2002068059 A | * | 3/2002 |
| JP | 2013067276 A | * | 4/2013 |
| JP | 2017-165229 A | | 9/2017 |
| JP | 6398126 | | 9/2018 |

* cited by examiner

Primary Examiner — Valentin Neacsu
Assistant Examiner — Hosam Shabara
(74) Attorney, Agent, or Firm — Snell & Wilmer LLP

(57) ABSTRACT

A saddle-riding vehicle includes: a canister in front of an engine and on one lateral side of a vehicle body in a vehicle widthwise direction with respect to a center axis of the vehicle body in the vehicle widthwise direction, the center axis extending in a front-to-rear direction; and an accessory stay extending in a vertical direction from a main frame that supports the engine. The canister has an elongate shape in a longitudinal direction of the canister, and the canister is disposed on an inner side of the accessory stay in the vehicle widthwise direction to be supported by the accessory stay with the longitudinal direction extending along the accessory stay.

8 Claims, 6 Drawing Sheets

SADDLE-RIDING VEHICLE

CROSS REFERENCE TO THE RELATED APPLICATION

This application is based on and claims Convention priority to Japanese patent application No. 2020-188445, filed Nov. 12, 2020, the entire disclosure of which is herein incorporated by reference as a part of this application.

BACKGROUND OF THE INVENTION

Field of the Invention

The present disclosure relates to a saddle-riding vehicle including a canister that adsorbs fuel vapor from a fuel tank.

Description of Related Art

Some saddle-riding vehicles such as motorcycles include a canister (for example, JP Patent No. 6398126).

Since a saddle-riding vehicle has a small dimension in a vehicle widthwise direction, there is a tight space in the vehicle widthwise direction, restricting arrangement of components.

SUMMARY OF THE INVENTION

The present disclosure provides a saddle-riding vehicle which allows a canister to be compactly disposed in a vehicle widthwise direction.

A saddle-riding vehicle according to the present disclosure includes: an engine which is a drive source of the vehicle; a main frame that supports the engine; a canister in front of the engine and on one lateral side of a vehicle body in a vehicle widthwise direction with respect to a center axis of the vehicle body in the vehicle widthwise direction, the center axis extending in a front-to-rear direction; and an accessory stay extending in a vertical direction from the main frame. The canister has an elongate shape in a longitudinal direction of the canister, and the canister is disposed on an inner side of the accessory stay in the vehicle widthwise direction to be supported by the accessory stay with the longitudinal direction extending along the accessory stay.

This constitution makes it possible to compactly dispose the canister in the vehicle widthwise direction, and therefore, other components can be easily disposed in the vicinity of the canister. This improves flexibility in arrangement of the components. Further, since the canister is disposed on the inner side of the accessory stay in the vehicle widthwise direction, the canister is protected against objects coming from outside or the like by the accessory stay.

The present disclosure encompasses any combination of at least two features disclosed in the claims and/or the specification and/or the drawings. In particular, any combination of two or more of the appended claims should be equally construed as included within the scope of the present disclosure.

BRIEF DESCRIPTION OF THE DRAWINGS

The present disclosure will be more clearly understood from the following description of preferred embodiments thereof, when taken in conjunction with the accompanying drawings. However, the embodiments and the drawings are given only for the purpose of illustration and explanation, and are not to be taken as limiting the scope of the present disclosure in any way whatsoever, which scope is to be determined by the appended claims. In the accompanying drawings, like reference numerals are used to denote like or corresponding parts throughout the several views:

DESCRIPTION OF THE EMBODIMENTS

Figure 1:
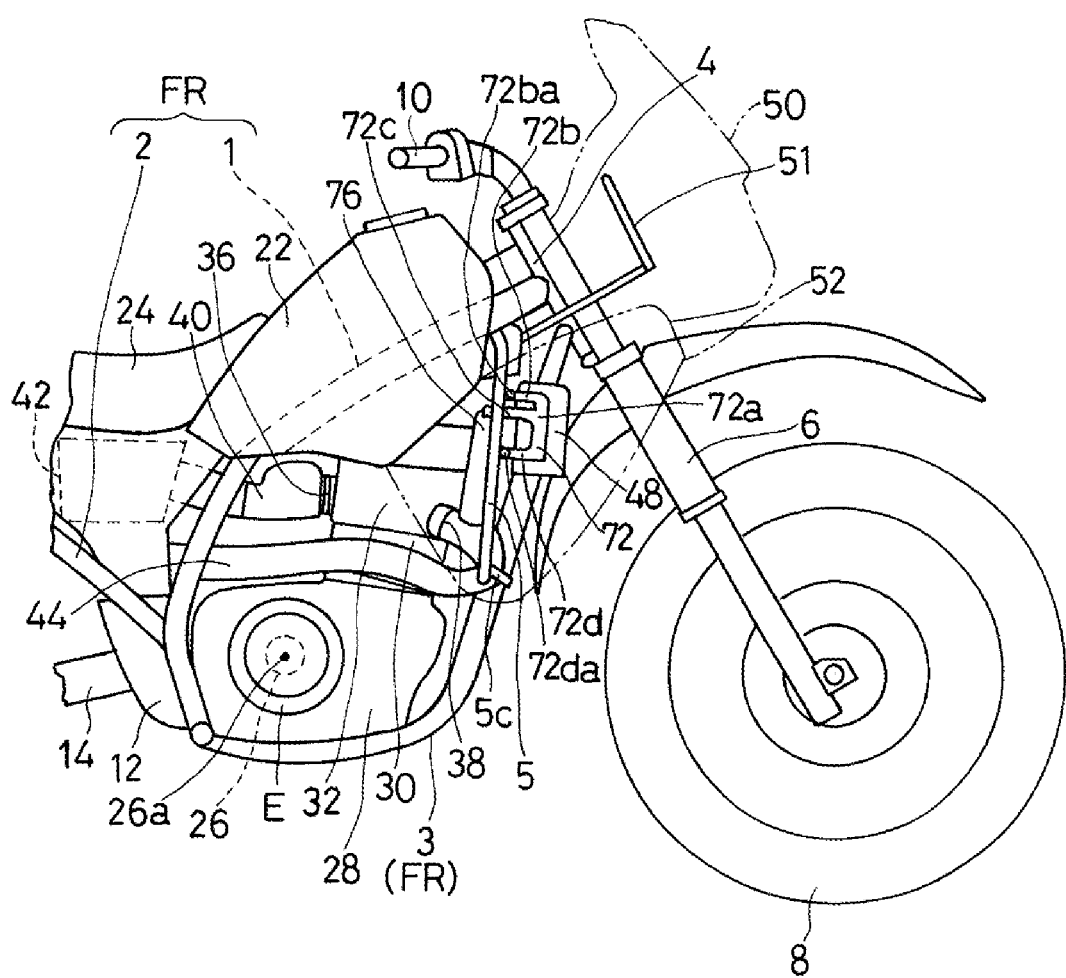
FIG. 1 is a side view showing a front part of a motorcycle which is a type of saddle-riding vehicle according to a first embodiment of the present disclosure.

Hereinafter, a preferred embodiment of the present disclosure will be described with reference to the drawings. FIG. 1 is a side view showing a front part of a motorcycle that is a type of saddle-riding vehicle according to a first embodiment of the present disclosure. In the present specification, the "right" and "left" correspond to "right" and "left" as a rider on the vehicle views, respectively. The "front" and "rear" correspond to "front" and "rear" in a direction of movement of the vehicle, respectively.

The motorcycle of the present embodiment includes a vehicle body frame FR which includes a main frame 1 which is a front half of the vehicle body frame and a rear frame 2 which is a rear half of the vehicle body frame. The main frame 1 extends rearward and diagonally downward from a head pipe 4 at a front end and then curves downward to extend in a vertical direction. The rear frame 2 extends rearward from a rear part of the main frame 1. The vehicle body frame FR of the present embodiment is a so-called backbone frame in which the main frame 1 extends in a front-to-rear direction or longitudinal direction of the vehicle body at a middle position in a vehicle widthwise direction.

The vehicle body frame FR further includes a lower frame 3. The lower frame 3 extends downward from the head pipe 4, then curves rearward and extends in the front-to-rear direction to be coupled to a lower end portion of the main frame 1.

Figure 3:
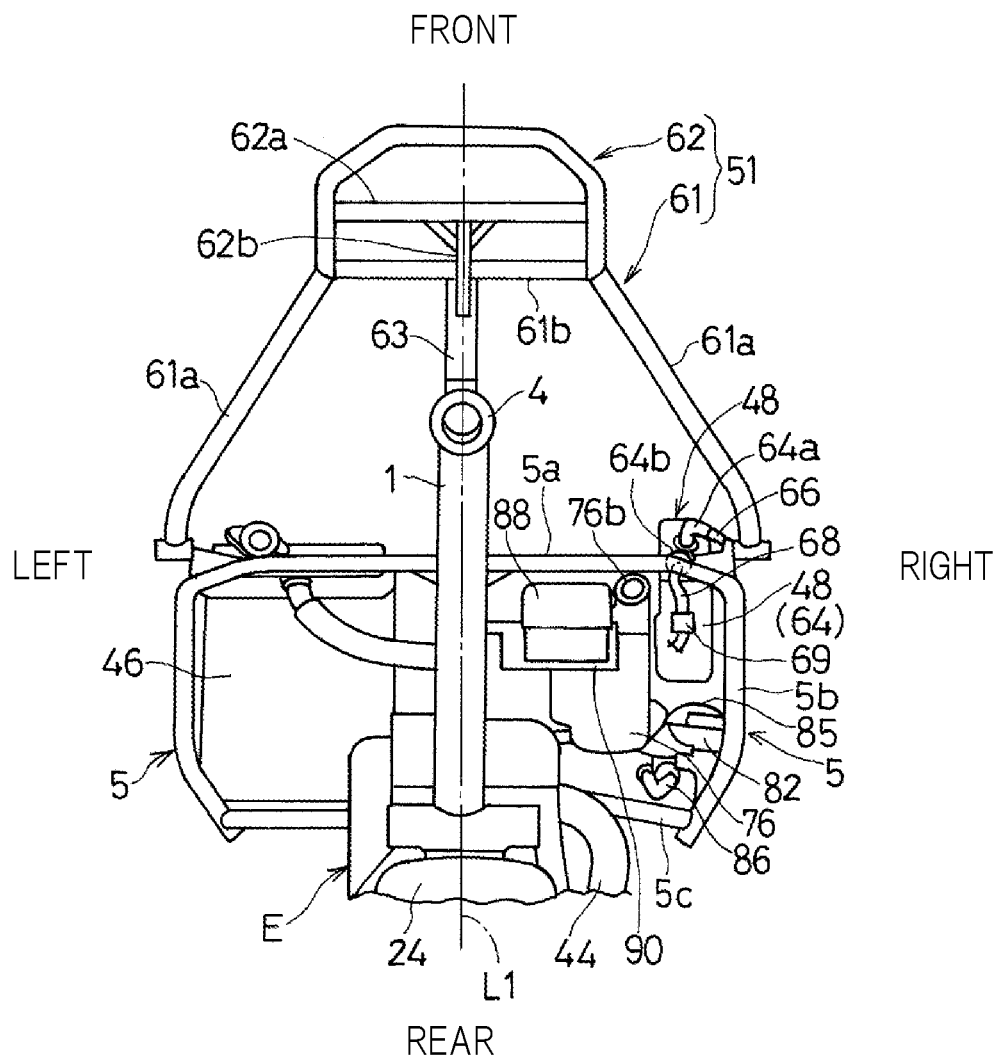
FIG. 3 is a plan view showing the front part of the motorcycle.

The vehicle body frame FR includes accessory stays 5 extending in the vertical direction. The left and right accessory stays 5 are arranged in a pair. Each accessory stay 5 has an upper end coupled to the main frame 1 and a lower end coupled to the lower frame 3. Specifically, each accessory stay 5 extends outward in the vehicle widthwise direction, then extends downward, and further extends inward in the vehicle widthwise direction to be coupled to the lower frame 3. In other words, as shown in FIG. 3, each accessory stay 5 includes a first stay piece 5a extending outward in the vehicle widthwise direction from the main frame 1, a second stay piece 5b extending downward from an outer lateral end of the first stay piece 5a, and a third stay piece 5c extending inward in the vehicle widthwise direction from a lower end of the second stay piece 5b to reach the lower frame 3.

A head pipe 4 shown in FIG. 1 turnably supports a front fork 6 through a steering shaft (not illustrated). The front fork 6 has a lower end to which a front wheel 8 is attached. The front fork 6 has an upper end portion to which steering handle bars 10 are attached.

The main frame 1 has a rear end portion including a swing arm bracket 12. The swing arm bracket 12 supports a swing arm 14 in such a way that the swing arm can swing in the vertical direction. The swing arm 14 has a rear end portion to which a rear wheel (not illustrated) is attached.

An engine E, which is a drive source of the vehicle body, is mounted below the main frame 1 and in front of the swing aim bracket 12. The engine E is disposed in an area defined by the main frame 1 and the lower frame 3 in a side view. The engine E drives the rear wheel through a power transmission member (not illustrated) such as a chain. A fuel tank 22 is disposed in an upper part of the main frame 1, and a seat 24 on which a driver sits is attached to the rear frame 2. The fuel tank 22 is disposed right above the engine E, behind the head pipe 4 and in front of the seat 24.

The engine E of the present embodiment is a water-cooled single-cylinder engine. However, the engine is not limited to this type of engine and may be a water-cooled engine or a multicylinder engine such as a two-cylinder engine, a four-cylinder engine, or the like. The engine E includes: a crankshaft 26 which is a rotation shaft of the engine E; a crankcase 28 rotatably supporting the crankshaft 26; a cylinder 30 protruding upward from the crankcase 28; and a cylinder head 32 coupled to an upper part of the cylinder 30. In the present embodiment, an axis 26a of the crankshaft 26 extends in the vehicle widthwise direction (i.e. left-to-right direction).

Figure 2:
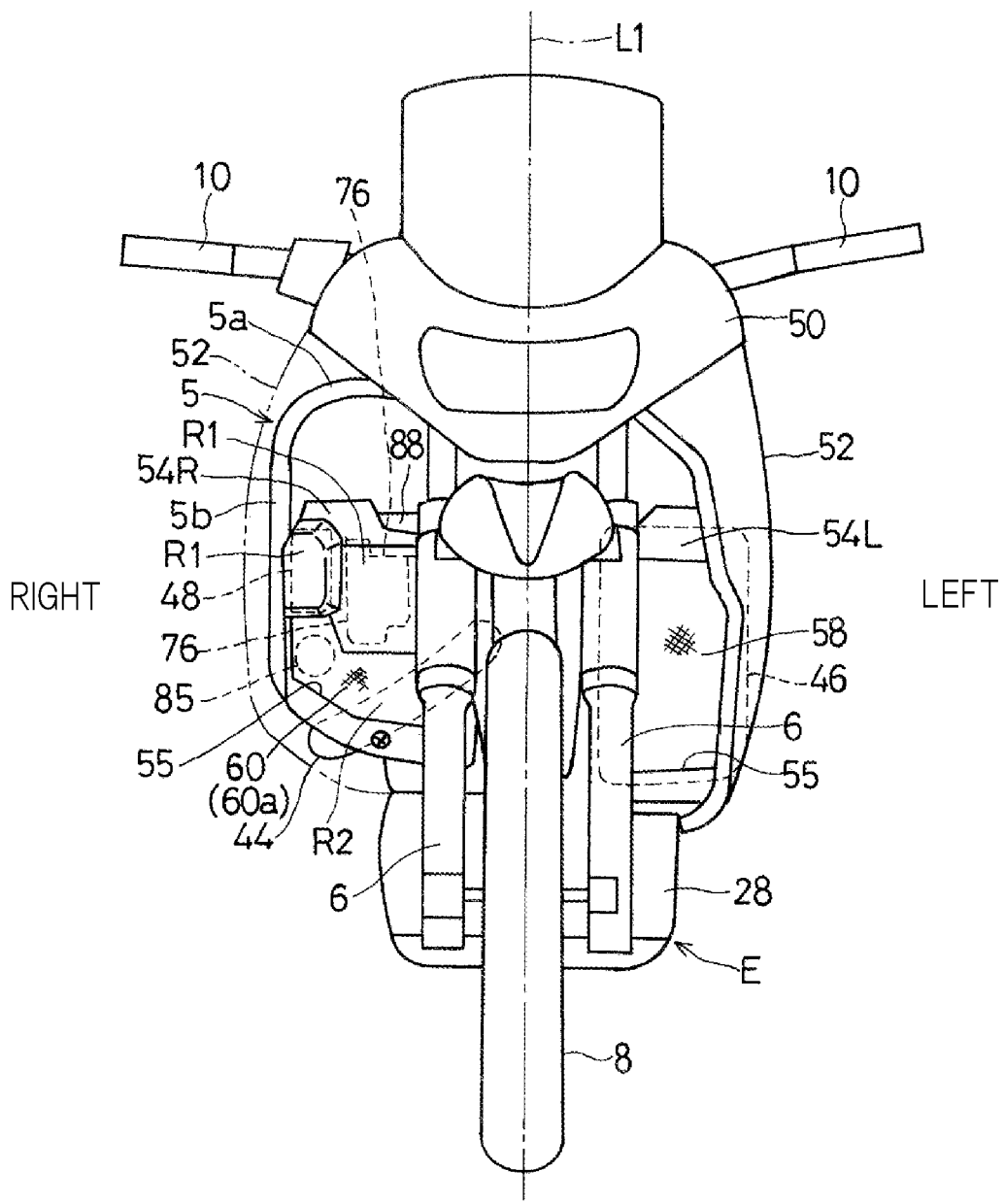
FIG. 2 is a front view of the motorcycle.

Each accessory stay 5 vertically extends in front of the engine E. Specifically, each accessory stay 5 vertically extends from above the cylinder head 32 to a lower end of the cylinder 30 in an anterior area of the engine E. As shown in FIG. 2, each accessory stay 5 vertically extends laterally outside of the engine E.

The cylinder head 32 as shown in FIG. 1 has a rear face including an intake port 36 and a front face including an exhaust port 38. A fuel supply device 40 is connected to the intake port 36, and an air cleaner 42 is connected to the fuel supply device 40. The air cleaner 42 filters outside air to generate purified air. The fuel supply device 40 injects fuel into the purified air from the air cleaner 42 to generate air-fuel mixture, and supplies the air-fuel mixture to the intake port 36. The fuel supply device 40 may be, for example, a throttle body including a fuel injection valve, a carburetor, or the like. The air cleaner 42 and the fuel supply device 40 define an intake passage that supplies air to the engine E.

An exhaust pipe 44 is connected to the exhaust port 38. The exhaust pipe 44 curves rearward from the front face of the cylinder head 32 and extends rearward on one lateral side of the cylinder head 32, namely, on the right side of the cylinder head 32 in the present embodiment. The exhaust pipe 44 has a rear end connected to an exhaust muffler (not illustrated). In the following description, the right side of a vehicle body is referred to as one lateral side in the vehicle widthwise direction, and the left side of the vehicle body is referred to as the other lateral side in the vehicle widthwise direction.

A radiator 46 is disposed in front of the engine E as shown in FIG. 3. The radiator 46 dissipates heat from coolant for the engine E, and includes a tube through which the coolant flows and a cooling fin provided to the tube. In the present embodiment, water is used as the coolant. The radiator 46 is disposed on the left side of the vehicle body in the vehicle widthwise direction with respect to a center line L1 of the vehicle body in the vehicle widthwise direction. The radiator 46 is disposed on an inner side of the accessory stay 5 and is supported by the lower frame 3 (FIG. 1) and the accessory stay 5.

A canister 48 is disposed in front of the engine E as shown in FIG. 1. The canister 48 adsorbs fuel vapor from the fuel tank 22 and returns the fuel vapor into a combustion chamber of the engine E. The canister 48 is disposed on the right side with respect to the center axis L1 (FIG. 2) of the vehicle body in the vehicle widthwise direction which extends in the front-to-rear direction. The canister 48 has an elongate shape in a longitudinal direction of the canister and is disposed on an inner side of the accessory stay 5 in the vehicle widthwise direction such that the longitudinal direction of the canister 48 extends along an extension direction (i.e. vertical direction) of the second stay piece 5b of the accessory stay 5. The canister 48 is disposed in front of the exhaust pipe 44, and a lower end of the canister 48 is located above the exhaust pipe 44. The canister 48 will be described later in detail.

A front cowl 50 is attached to a front part of the vehicle body. The front cowl 50 covers an anterior area of the head pipe 4 as shown in FIG. 1. The front cowl 50 is supported by the main frame 1 through a cowl stay 51. The cowl stay 51 may include, for example, a steel pipe. In the present embodiment, the cowl stay 51 is coupled to the accessory stays 5.

Specifically, as shown in the plan view of FIG. 3, the cowl stay 51 includes: a first part 61 that is attached to the vehicle body; and a second part 62 that extends upward from the first part 61 to support the front cowl 50. The first part 61 has a U shape that opens rearward, and includes: left and right branched parts 61a, 61a including rear ends coupled to the accessory stays 5; and a base part 61b coupled to a head bracket 63 protruding frontward from the head pipe 4. The second part 62 includes a middle bar 62a which extends toward the left and right sides, and a center part of the middle bar 62a is also supported by the head bracket 63 through a coupling bar 62b. The configuration of the cowl stay 51 is not limited to this structure.

A pair of left and right shrouds 52 are disposed behind and below the front cowl 50 shown in FIG. 1. The shrouds 52 are removably attached to the vehicle body frame FR by a fastening member (not illustrated) such as a bolt through the accessory stays 5. In FIG. 1, the front cowl 50 and the shroud 52 are illustrated with double-dotted lines. The left shroud 52 in FIG. 2 covers the radiator 46 from laterally outside, and the right shroud 52 covers the canister 48 from laterally outside.

A pair of left and right inner cowls 54L, 54R are disposed in front of the radiator 46 and the canister 48. The left inner cowl 54L is disposed in front of the radiator 46 and guides incoming wind toward the radiator 46. Specifically, the left inner cowl 54L includes an air introduction port 55 which introduces incoming wind into the radiator 46. A first (left-side) screen 58 having a latticed pattern is attached to the air introduction port 55. The first screen 58 protects the radiator 46 from stone chips or the like during traveling. That is, the screen 58 allows incoming wind to pass through the screen but does not allow foreign objects such as stone chips or the like to pass through the screen 58.

The right inner cowl 54R is disposed in front of the canister 48. The right inner cowl 54R also includes an air introduction port 55, and a second (right-side) screen 60 having a latticed pattern is attached to the air introduction port 55. The second screen 60 covers an anterior area of the exhaust pipe 44. Incoming wind is supplied to the exhaust pipe 44 through openings of the latticed second screen 60.

That is, the openings of the second screen 60 serve as air introduction holes 60a that guide incoming wind into the exhaust pipe 44.

The air introduction holes 60a are located in a lower area of the screen 60 with respect to the canister 48. In the present embodiment, the second screen 60 includes: an opposing region R1 in which the second screen 60 is opposed to the canister 48 in the front-to-rear direction; and a non-opposing region R2 which is a region other than the opposing region R1, and the air introduction holes 60a are located in the non-opposing region R2. Although the opposing region R1 is closed in the present embodiment, the opposing region R1 may include slits (openings) that are narrower than the air introduction holes 60a. This makes it possible to guide incoming air rearward while preventing foreign objects from hitting the canister 48.

As shown in FIG. 3, the canister 48 includes an adsorbent material (not illustrated) which adsorbs fuel vapor and a container 64 which receives the adsorbent material. The adsorbent material may be, for example, activated carbon. The container 64 has a rectangular shape in a longitudinal direction of the container 64. The container 64 has an upper face including a gas inlet part 64a and a gas outlet part 64b. A vaporized gas passage 66 is connected to the gas inlet part 64a, and a purge passage 68 is connected to the gas outlet part 64b.

The vaporized gas passage 66 communicates a fuel supply port of the fuel tank 22 with the canister 48, and fuel vapor is supplied into the container 64 of the canister 48 via the vaporized gas passage 66. The fuel vapor supplied to the container 64 is adsorbed by the adsorbent material. The purge passage 68 communicates the canister 48 with the intake passage of the engine E. Inside the container 64, there is a passage through which fresh air (purge air) is taken in. When purge air is taken in, the fuel vapor is desorbed from the adsorbent material and is delivered to the intake passage of the engine E via the purge passage 68.

Figure 4:
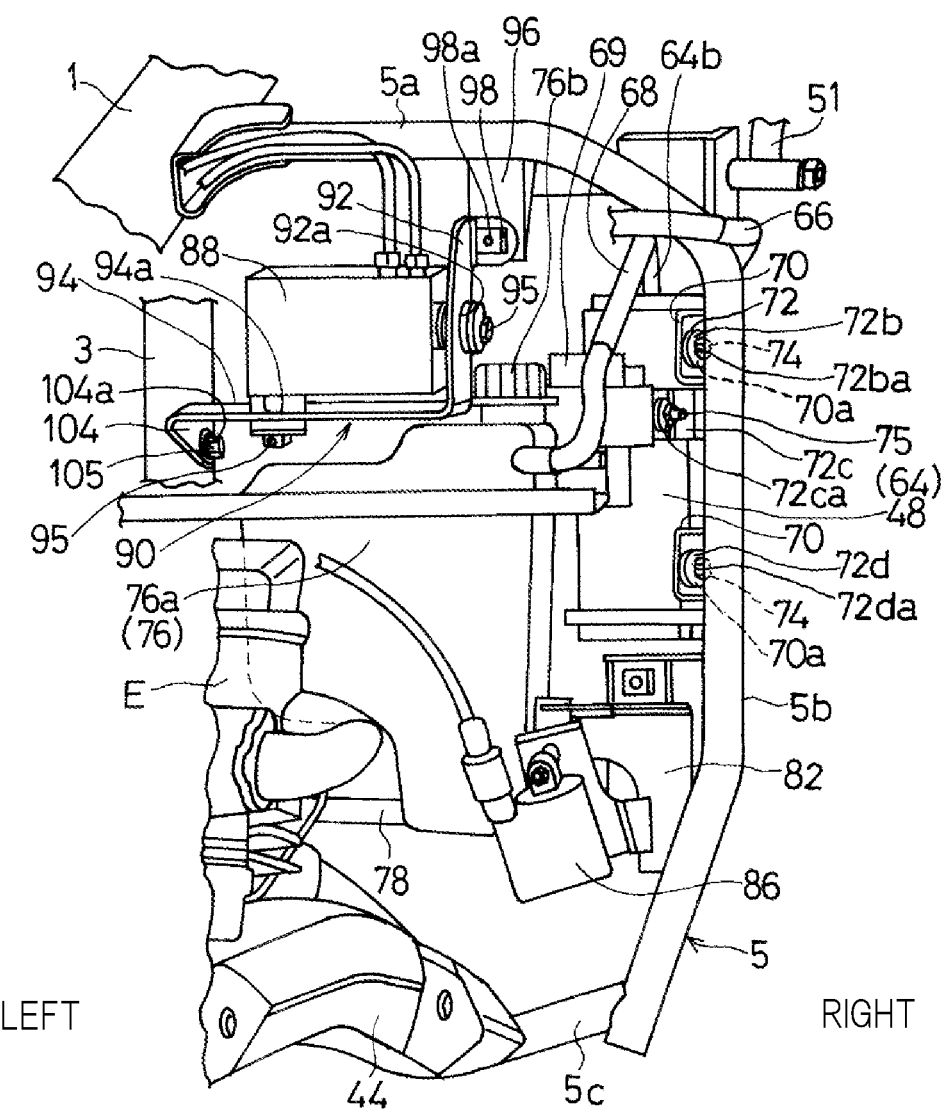
FIG. 4 is a rear perspective view showing the front part of the motorcycle.

The purge passage 68 includes a purge valve 69 as shown in FIG. 4. In the present embodiment, the purge valve 69 is an electromagnetic valve. However, the purge valve 69 is not limited to this type of valve. The purge valve 69 is controlled, for example, by an electronic control unit (ECU) for the engine. The purge valve 69 may be controlled such that the fuel vapor is sucked from the canister 48 only when the intake passage is under negative pressure due to rotation of the engine E.

A support structure for the canister 48 will be described. There is a first bracket 70 in an upper part of the second stay piece 5b of the accessory stay 5. In the present embodiment, there are two first brackets 70 arranged in the vertical direction. There may be a greater or smaller number of the first brackets 70 than two. The first brackets 70 of the present embodiment are made of a sheet metal and are fixedly attached to an inner side of the second stay piece 5b of the accessory stay 5, for example, by welding. Each first bracket 70 includes a threaded hole 70a facing the vehicle widthwise direction. The threaded hole 70a is, for example, a weld nut.

As shown in FIG. 1, a second bracket 72 is attached to an outer lateral face of the container 64 of the canister 48. The second bracket 72 of the present embodiment is made of a sheet metal and is removably attached to the container 64 by a fastening member (not illustrated) such as a screw body. Alternatively, the second bracket 72 may be inseparably integrated with the container 64.

The second bracket 72 includes an attachment part 72a which is attached to the container 64 and three, first to third protruding pieces 72b, 72c, 72d extending rearward. The first protruding piece 72b at an uppermost position and the third protruding piece 72d at a lowermost position have a same protrusion length, and the second protruding piece 72c at a middle position has a greater protrusion length to the rear than that of the other two protruding pieces 72b, 72d. The first protruding piece 72b and the lowermost, third protruding piece 72d include insertion holes 72ba, 72da facing the vehicle widthwise direction. The second protruding piece 72c includes a threaded hole 72ca facing the vehicle widthwise direction as shown in FIG. 4. The threaded hole 72ca is, for example, a weld nut.

A fastening member 75 such as a bolt is inserted into an attachment hole (not illustrated) of the purge valve 69 in the purge passage 68 to the canister 48 and is fastened to the threaded hole 72ca of the second bracket 72. Thus, the canister 48 and the purge valve 69 are integrated into the form of a subassembly. Further, fastening members 74 such as a bolt are inserted into the insertion holes 72ba, 72da of the second bracket 72 and are fastened to the threaded holes 70a of the first brackets 70. Thus, the subassembly including the canister 48 and the purge valve 69 is supported by the accessory stay 5.

A reservoir tank 76 is disposed in front of the engine E as shown in FIG. 3. The reservoir tank 76 stores coolant for the radiator 46. The reservoir tank 76 is located on the right side (one lateral side in the vehicle widthwise direction) with respect to the center axis L1 in the vehicle widthwise direction and is arranged next to or juxtaposed to the canister 48 in the vehicle widthwise direction. Specifically, the canister 48 is disposed on an outer side (right side) with respect to the reservoir tank 76 in the vehicle widthwise direction. The reservoir tank 76 partially overlaps the canister 48 in a side view of FIG. 1.

The reservoir tank 76 and the canister 48 are located forward with respect to the exhaust pipe 44. In the vertical direction, in the present embodiment, the lower end of the canister 48 is located above a lower end of the reservoir tank 76 and above the exhaust pipe 44.

In the present embodiment, the opposing region R1 also includes a part of the second screen 60 in which the second screen 60 is opposed to the reservoir tank 76 in the front-to-rear direction as shown in FIG. 2. Specifically, the opposing region R1 in which the second screen 60 is opposed to the reservoir tank 76 is closed.

Figure 5:
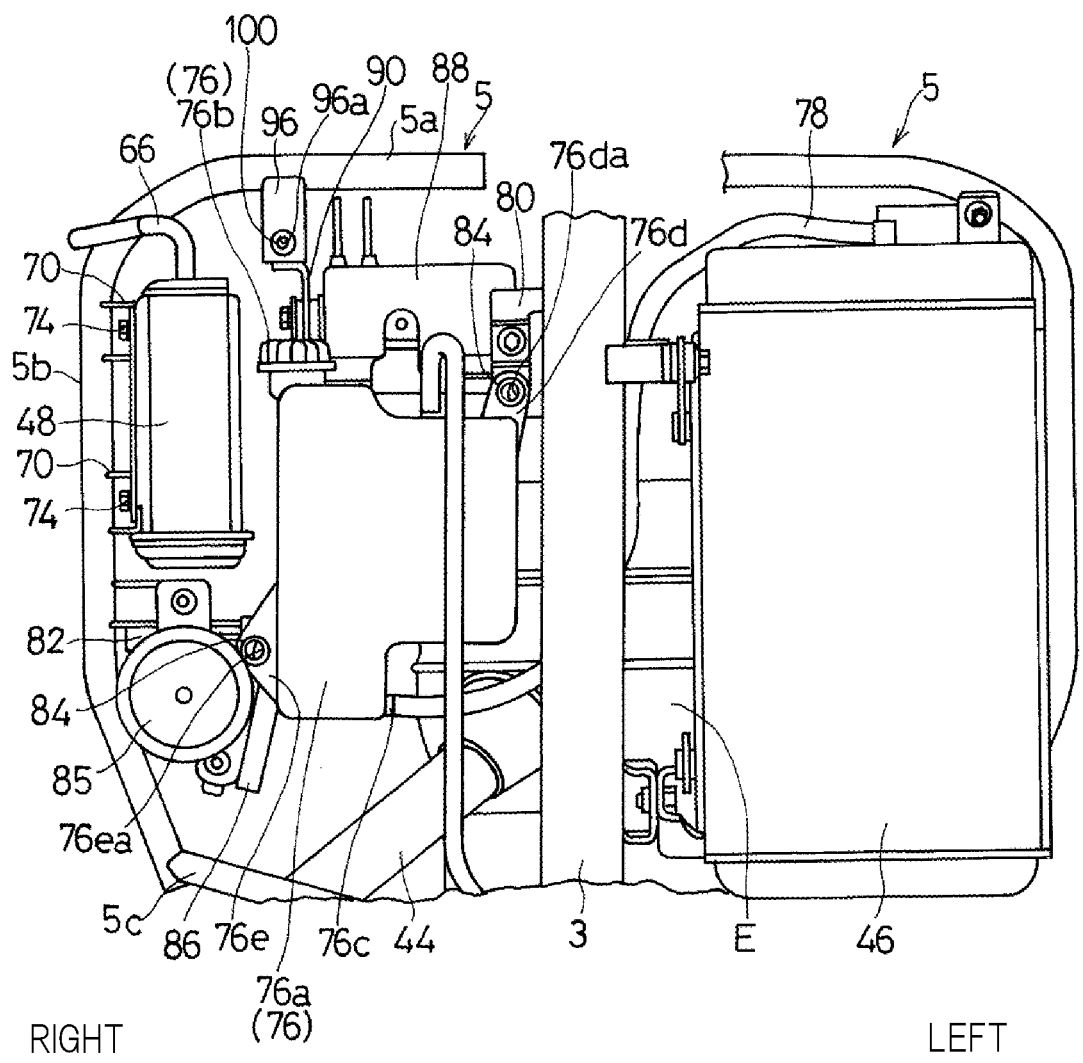
FIG. 5 is a front view showing a major part of the front part of the motorcycle.

As shown in FIG. 5, the reservoir tank 76 includes a tank body 76a which stores the coolant and a cap 76b which opens and closes a liquid supply port on an upper face of the tank body 76a. The tank body 76a has a lower end portion including an outlet part 76c, and the outlet part 76c is connected to the radiator 46 by a rubber tube 78.

The tank body 76a includes a first attachment piece 76d protruding upward at an upper left part of the tank body 76a. The tank body 76a also includes a second attachment piece 76e protruding toward the right side at a lower right part of the tank body 76a. The first and second attachment pieces 76d, 76e include attachment holes 76da, 76ea facing the front-to-rear direction.

The lower frame 3 has an upper part including a first tank stay 80 protruding toward the right side of the vehicle body. The first tank stay 80 of the present embodiment is made of a sheet metal and is welded to the lower frame 3. The first tank stay 80 includes a threaded hole (not illustrated) facing the front-to-rear direction. The accessory stay 5 includes, in a lower part of the second stay piece 5b, a second tank stay 82 (FIG. 4) protruding toward the left side of the vehicle body. The second tank stay 82 of the present embodiment is made of a sheet metal and is welded to the accessory stay 5.

The second tank stay 82 includes a threaded hole (not illustrated) facing the front-to-rear direction. Each threaded hole (not illustrated) is, for example, a weld nut.

Fastening members 84 such as a bolt are inserted from a front side into the attachment holes 76da, 76ea of the first and second attachment pieces 76d, 76e of the reservoir tank 76 and are fastened to the threaded holes (not illustrated) of the first and second tank stays 80, 82. Thus, the reservoir tank 76 is supported by the vehicle body frame FR. The support structure for the reservoir tank 76 is not limited to this configuration.

Figure 6:
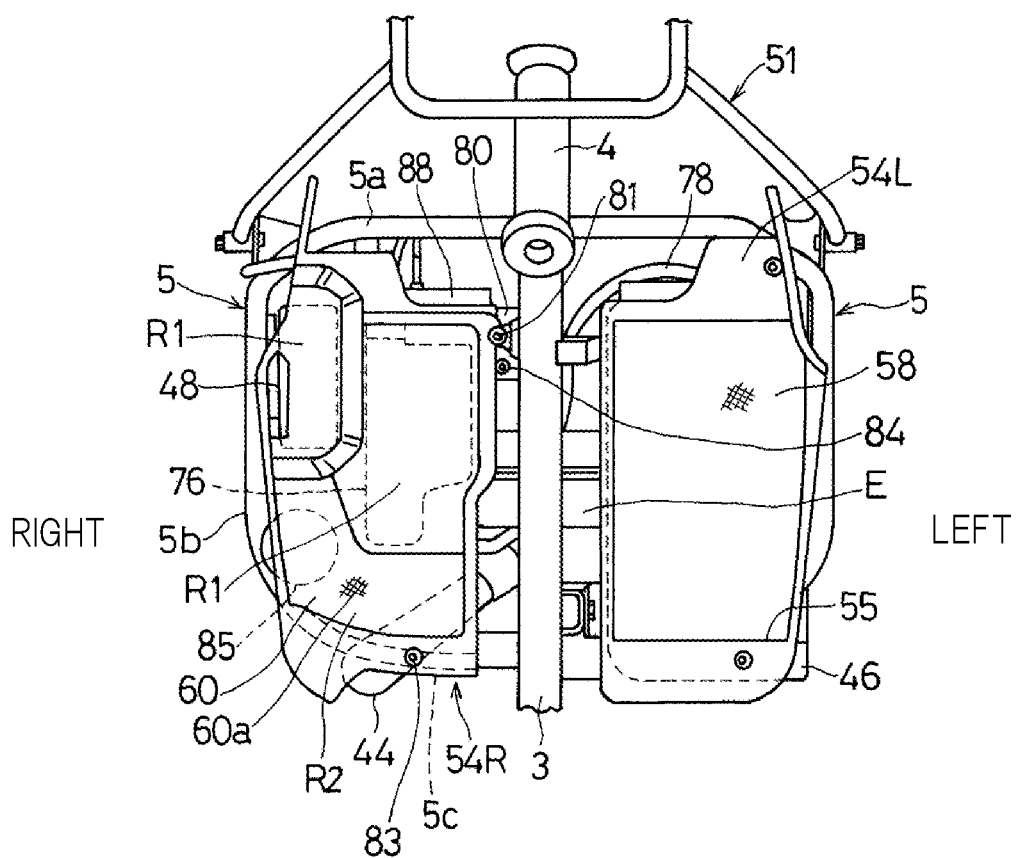
FIG. 6 is a front view showing the front part of the motorcycle.

In the present embodiment, an upper part of the right inner cowl 54R (FIG. 2) is attached to the first tank stay 80 of FIG. 6 by a fastening member 81. A lower part of the right inner cowl 54R is attached to the third stay piece 5c of the accessory stay 5 by a fastening member 83. Further, an outer lateral part of the right inner cowl 54R is coupled to the shroud 52 (FIG. 1).

The second tank stay 82 of FIG. 4 supports a horn 85 and an ignition coil 86. That is, the horn 85 and the ignition coil 86 are arranged next to each other in the front-to-rear direction, below the canister 48 and on the right side of the lower part of the reservoir tank 76. Since the second tank stay 82 also supports both the horn 85 and the ignition coil 86, the number of components can be reduced as compared with the case where dedicated members are used to support them.

An antilock brake system (ABS) unit 88 is disposed in front of the engine E as shown in FIG. 3. The ABS unit 88 controls a brake of the vehicle. The ABS unit 88 is located on the right side (one lateral side in the vehicle widthwise direction) with respect to the center axis L1 in the vehicle widthwise direction and is arranged next to or juxtaposed to the canister 48 in the vehicle widthwise direction. Specifically, as shown in FIG. 4, the ABS unit 88 is disposed above the reservoir tank 76 and on the left side of the canister 48. More specifically, the ABS unit 88 is disposed above a left half of the reservoir tank 76. That is, the ABS unit 88 is disposed so as to avoid the cap 76b of the reservoir tank 76, so that the cap 76b is exposed upward.

The ABS unit 88 is supported by the vehicle body frame FR through an ABS unit bracket 90. The ABS unit bracket 90 is a bent sheet metal and includes an outer lateral wall 92 that includes a main face facing the vehicle widthwise direction and a lower wall 94 that includes a main face facing the vertical direction.

The outer lateral wall 92 includes an attachment hole 92a facing the vehicle widthwise direction, and the lower wall 94 includes an attachment hole 94a facing the vertical direction. The ABS unit 88 is attached to the ABS unit bracket 90 by bolts 95 inserted through these attachment holes 92a, 94a with interposition of a rubber mount including an elastic member, which together take the form of a subassembly.

An upper end of the outer lateral wall 92 of the ABS unit bracket 90 is supported by the accessory stay 5, and an inner lateral end of the lower wall 94 in the vehicle widthwise direction is supported by the lower frame 3. The first stay piece 5a of the accessory stay 5 includes a first unit stay 96 protruding downward, and the first unit stay 96 includes an insertion hole 96a (FIG. 5) facing the front-to-rear direction. The upper end of the outer lateral wall 92 of the ABS unit bracket 90 includes a first attachment piece 98, and the first attachment piece 98 includes a threaded hole 98a (for example, a weld nut) facing the front-to-rear direction.

A fastening member 100 (FIG. 5) such as a bolt is inserted into the insertion hole 96a of the first unit stay 96 from the front of the vehicle body and is fastened to the threaded hole 98a of the ABS unit bracket 90. Thus, the upper end of the outer lateral wall 92 of the ABS unit bracket 90 is supported by the accessory stay 5.

The inner end of the lower wall 94 of the ABS unit bracket 90 in the vehicle widthwise direction includes a second attachment piece 104, and the second attachment piece 104 includes an attachment hole 104a facing the vehicle widthwise direction. A fastening member 105 such as a bolt is inserted into the attachment hole 104a of the ABS unit bracket 90 from laterally outside (right side) of the vehicle body and is fastened to a threaded hole (not illustrated) in the lower frame 3. The threaded hole in the lower frame 3 is located at a bracket attached to the lower frame 3. Thus, the inner end of the lower wall 94 of the ABS unit bracket 90 in the vehicle widthwise direction is supported by the lower frame 3. In the way described above, the ABS unit 88 is supported by the vehicle body through the ABS unit bracket 90.

According to the above constitution, as shown in FIG. 2, the canister 48 is disposed on the right side with respect to the center axis L1 in the vehicle widthwise direction and along the accessory stay 5 whose longitudinal direction extends in the vertical direction. This makes it possible to compactly dispose the canister 48 in the vehicle widthwise direction, and therefore, components such as the reservoir tank 76 and the ABS unit 88 can be easily arranged in the vicinity of the canister 48. This improves flexibility in arrangement of the components. Further, since the canister 48 is disposed on the inner side of the accessory stay 5 in the vehicle widthwise direction, the canister 48 is protected against objects coming from outside or the like by the accessory stay 5.

In addition, the shroud 52 supported by the accessory stay 5 covers the canister 48 from laterally outside. Thus, the canister 48 is not exposed to laterally outside, imparting good appearance. The shroud 52 also protects the canister 48.

Further, the radiator 46 is disposed on the left side with respect to the center axis L1 in the vehicle widthwise direction. Thus, the canister 48 is disposed opposite to the radiator 46 with respect to the center axis L1 in the vehicle widthwise direction, and therefore, the canister 48 can be disposed away from the radiator 46. Consequently, it is possible to prevent the canister 48 from being heated by exhaust air from the radiator 46.

The reservoir tank 76 is arranged on the right side with respect to the center axis L1 in the vehicle widthwise direction and next to the canister 48 in the vehicle widthwise direction. If the canister 48 is disposed such that the longitudinal direction of the canister 48 extends in the vehicle widthwise direction, it would be difficult to arrange the canister 48 and other components next to each other in the vehicle widthwise direction. The above configuration in which the canister 48 is disposed such that the longitudinal direction of the canister 48 extends in the vertical direction makes it possible to compactly dispose the canister 48 and the reservoir tank 76 in the vehicle widthwise direction. In the present embodiment, the canister 48 is disposed on the second stay piece 5b of the accessory stay 5 which is located on the outer side in the vehicle widthwise direction and extends in the vertical direction, such that the longitudinal direction of the canister 48 extends in the vertical direction. This makes it possible to arrange the canister 48 and the reservoir tank 76 next to each other in the vehicle widthwise direction.

The canister 48 is disposed on the outer side with respect to the reservoir tank 76 in the vehicle widthwise direction.

Thus, the reservoir tank 76 which is relatively heavy is disposed on the inner side, so that the vehicle has good weight balance. This also makes it possible to dispose the canister 48 away from the radiator 76 so as to avoid the influence of exhaust air.

Further, the reservoir tank 76 and the canister 48 are disposed in front of the exhaust pipe 44 as shown in FIG. 3, and the lower end of the canister 48 is located above the lower end of the reservoir tank 76 and above the exhaust pipe 44 as shown in FIG. 1. According to this constitution, the canister 48 can be sufficiently separated upward from the exhaust pipe 44, and therefore, it is possible to suppress temperature rise in the canister 48 due to heat from the exhaust pipe 44.

The non-opposing region R2 of the second screen 60 as shown in FIG. 2 includes the air introduction holes 60a which guide incoming wind into the exhaust pipe 44. This makes it possible to disperse hot air around the exhaust pipe 44 by incoming wind so as to suppress temperature rise in the canister 48.

As shown in FIG. 3, the ABS unit 88 is disposed above the reservoir tank 76 and next to the canister 48 in the vehicle widthwise direction. Specifically, the ABS unit 88 is disposed above the left half of the reservoir tank 76 so as to avoid the cap 76b of the reservoir tank 76, and the canister 48 is disposed on the right side of the reservoir tank 76. This makes it possible to compactly dispose the ABS unit 88, the canister 48, and the reservoir tank 76 in a horizontal direction.

Further, the canister 48 is shiftedly disposed forward with respect to the ABS unit 88 and the reservoir tank 76 in order to avoid interference with the fuel tank 22. Specifically, the canister 48 in FIG. 1 is disposed such that a front face of the canister 48 is located forward with respect to a front face of the ABS unit 88 and a front face of the reservoir tank 76. This makes it possible to secure a sufficient capacity of the fuel tank 22. Thus, in the present embodiment, a horizontal space in front of the engine is effectively used.

The cowl stay 51 is coupled to the accessory stays 5, and therefore, the accessory stays 5 have improved support rigidity. Thus, the shrouds 52, the canister 48, the ABS unit 88 and the reservoir tank 76 can be stably supported.

In the present disclosure, as described above, the vehicle may further include a pair of left and right shrouds that cover the canister from outside in the vehicle widthwise direction, and the shrouds may be supported by the accessory stay. According to this constitution, the canister is not exposed to laterally outside thanks to the shrouds, imparting good appearance. The shrouds also protect the canister.

The vehicle may further include a radiator in front of the engine and on the other lateral side in vehicle widthwise direction with respect to the center axis of the vehicle body in the vehicle widthwise direction. According to this constitution, the canister can be disposed away from the radiator, and therefore, it is possible to prevent the canister from being heated by exhaust air from the radiator.

In this case, the vehicle may further include a reservoir tank that stores coolant for the radiator and is supported by the accessory stay, and the reservoir tank may be disposed on the one lateral side in the vehicle widthwise direction with respect to the center axis of the vehicle body in the vehicle widthwise direction and next to or juxtaposed to the canister in the vehicle widthwise direction. According to this constitution, the canister and the reservoir tank are disposed on a same side in the vehicle widthwise direction, and therefore, they can be compactly disposed.

In this case, the canister may be disposed on an outer side with respect to the reservoir tank in the vehicle widthwise direction. According to this constitution, the reservoir tank which is relatively heavy is disposed on an inner side, so that the vehicle has good weight balance. This also makes it possible to dispose the canister away from the radiator, so as to avoid the influence of exhaust air.

When the vehicle includes the reservoir tank, the vehicle may further include an exhaust pipe disposed on the one lateral side in the vehicle widthwise direction with respect to the engine, the reservoir tank and the canister may be located in front of the exhaust pipe, and a lower end of the canister may be located above a lower end of the reservoir tank. According to this constitution, the canister can be sufficiently separated upward from the exhaust pipe, so that it is possible to suppress temperature rise in the canister due to heat from the exhaust pipe.

In this case, the vehicle may further include a screen that covers the reservoir tank and the canister from a front side, the screen may include: an opposing region in which the screen is opposed to the reservoir tank and the canister; and a non-opposing region which is a region other than the opposing region, and the screen includes, in the non-opposing region, an air introduction hole that guides incoming air into the exhaust pipe. This constitution makes it possible to disperse hot air around the exhaust pipe by incoming wind, so as to suppress temperature rise in the canister.

When the vehicle includes the reservoir tank, the vehicle may further include an ABS unit that controls a brake of the vehicle and is supported by the accessory stay, and the ABS unit may be disposed above the reservoir tank and next to or juxtaposed to the canister in the vehicle widthwise direction. According to this constitution, the ABS unit, the canister, and the reservoir tank can be compactly disposed in the horizontal direction.

The vehicle may further include: a front cowl that covers a front part of the vehicle body; and a cowl stay that supports the front cowl on the vehicle body, and the cowl stay may be coupled to the accessory stay. According to this constitution, the cowl stay and the accessory stay are coupled to each other, and therefore, support rigidity is improved.

The present disclosure is not limited to the above embodiment, and various additions, modifications, or deletions may be made without departing from the scope of the disclosure. For example, although the above description of the embodiment is made with reference to an example of a motorcycle according to the present disclosure, the present disclosure may also be applied to other saddle-riding vehicles than motorcycles, such as three-wheelers and four-wheel buggies. Accordingly, such variants are included within the scope of the present disclosure.

What is claimed is:
1. A saddle-riding vehicle comprising:
an engine which is a drive source of the vehicle;
a main frame which supports the engine;
a canister in front of the engine and on one lateral side of a vehicle body in a vehicle widthwise direction with respect to a center axis of the vehicle body in the vehicle widthwise direction, the center axis extending in a front-to-rear direction;
an accessory stay extending in a vertical direction from the main frame;
a radiator in front of the engine, wherein the radiator is disposed on the other lateral side in vehicle widthwise direction with respect to the center axis of the vehicle body in the vehicle widthwise direction; and a reservoir tank that stores coolant for the radiator and is supported by the accessory stay, wherein the canister has an elongate shape in a longitudinal direction of the canister, and the canister is disposed on an inner side of the accessory stay in the vehicle widthwise direction to be supported by the accessory stay with the longitudinal direction extending along the accessory stay, and wherein the reservoir tank is disposed on the one lateral side in the vehicle widthwise direction with respect to the center axis of the vehicle body in the vehicle widthwise direction and next to the canister in the vehicle widthwise direction.

2. A saddle-riding vehicle comprising:

an engine which is a drive source of the vehicle;

a main frame which supports the engine;

a canister in front of the engine and on one lateral side of a vehicle body in a vehicle widthwise direction with respect to a center axis of the vehicle body in the vehicle widthwise direction, the center axis extending in a front-to-rear direction;

an accessory stay extending in a vertical direction from the main frame; and a pair of shrouds disposed on the one lateral side and the other one lateral side of the vehicle body in the vehicle widthwise direction to cover the vehicle body from outside in the vehicle widthwise direction, wherein the canister has an elongate shape in a longitudinal direction of the canister, and the canister is disposed on an inner side of the accessory stay in the vehicle widthwise direction to be supported by the accessory stay with the longitudinal direction extending along the accessory stay, and wherein the shroud on the one lateral side covers the canister from outside in the vehicle widthwise direction and is supported by the accessory stay.

3. The saddle-riding vehicle as claimed in claim 1, wherein the canister is disposed on an outer side with respect to the reservoir tank in the vehicle widthwise direction.

4. The saddle-riding vehicle as claimed in claim 1, further comprising an exhaust pipe disposed on the one lateral side in the vehicle widthwise direction with respect to the engine, wherein the reservoir tank and the canister are located in front of the exhaust pipe, and a lower end of the canister is located above a lower end of the reservoir tank.

5. The saddle-riding vehicle as claimed in claim 4, further comprising a screen that covers the reservoir tank and the canister from a front side, wherein the screen includes: an opposing region in which the screen is opposed to the reservoir tank and the canister; and a non-opposing region which is a region other than the opposing region, and the screen includes, in the non-opposing region, an air introduction hole that guides incoming air into the exhaust pipe.

6. The saddle-riding vehicle as claimed in claim 1, further comprising an ABS unit that controls a brake of the vehicle and is supported by the accessory stay, wherein the ABS unit is disposed above the reservoir tank and next to the canister in the vehicle widthwise direction.

7. A saddle-riding vehicle comprising:

an engine which is a drive source of the vehicle;

a main frame which supports the engine;

a canister in front of the engine and on one lateral side of a vehicle body in a vehicle widthwise direction with respect to a center axis of the vehicle body in the vehicle widthwise direction, the center axis extending in a front-to-rear direction;

an accessory stay extending in a vertical direction from the main frame; and a front cowl that covers a front part of the vehicle body; and a cowl stay that supports the front cowl on the vehicle body, wherein the canister has an elongate shape in a longitudinal direction of the canister, and the canister is disposed on an inner side of the accessory stay in the vehicle widthwise direction to be supported by the accessory stay with the longitudinal direction extending along the accessory stay, and wherein the cowl stay is coupled to the accessory stay.

8. The saddle-riding vehicle as claimed in claim 2, wherein the whole of the canister, in lateral side view, overlaps the shroud on the one lateral side.

* * * * *